United States Patent [19]

Matsuura et al.

[11] Patent Number: 5,015,130
[45] Date of Patent: May 14, 1991

[54] CONTOUR PROFILING MACHINE

[75] Inventors: Hitoshi Matsuura, Hachioji; Osamu Tsukamoto, Yamanashi, both of Japan

[73] Assignee: Fanuc Ltd., Minamitsuru, Japan

[21] Appl. No.: 309,555

[22] PCT Filed: Jun. 20, 1988

[86] PCT No.: PCT/JP88/00608
§ 371 Date: Feb. 7, 1989
§ 102(e) Date: Feb. 7, 1989

[87] PCT Pub. No.: WO88/10173
PCT Pub. Date: Dec. 29, 1988

[30] Foreign Application Priority Data

Jun. 19, 1987 [JP] Japan .................................. 62-152573

[51] Int. Cl.⁵ .................... B23Q 35/04; G05B 19/18
[52] U.S. Cl. ........................................ 409/80; 318/578; 364/474.03
[58] Field of Search ............... 409/80, 93, 98, 99, 409/114, 127; 364/474.03, 474.22, 474.34, 474.18, 474.29, 474.33; 318/578

[56] References Cited

U.S. PATENT DOCUMENTS

| | | |
|---|---|---|
| 4,266,172 | 5/1981 | Yamazaki ........................ 364/474.03 |
| 4,356,552 | 10/1982 | Imazeki et al. ................. 364/474.22 |
| 4,703,239 | 10/1987 | Yamazaki et al. ................. 318/578 |
| 4,747,734 | 5/1988 | Ide et al. ................................. 409/99 |

FOREIGN PATENT DOCUMENTS 127954 12/1983 Japan .............................. 364/474.03

Primary Examiner—William Briggs
Attorney, Agent, or Firm—Staas & Halsey

[57] ABSTRACT

A contour profiling machine for the purposes of shortening the period of time for rough machining and forming a smooth machined surface in the execution of machining wherein the outer part or inner part of a workpiece is cut away along the contour of a model (MDL). The contour profiling machine according to the present invention includes a limit setting circuit for setting a limit as to one axis of a tracer head (TC), and for setting limits parallel to and limits orthogonal to a traveling direction within a movement plane which is determined by the first-mentioned limit. A polarity discrimination circuit discriminates the polarities of the limits set relative to the direction of movement of the tracer head (TC). A clamping ciruit clamps contour profiling within a range which is defined by the set limits.

5 Claims, 6 Drawing Sheets

+ DIRECTION OF ROTATION

− DIRECTION OF ROTATION

+ DIRECTION OF ROTATION

- DIRECTION OF ROTATION

CONTOUR PROFILING MACHINE

FIELD OF THE INVENTION

The present invention relates to a contour profiling machine for the execution of machining in which the outer part or inner part of a workpiece is cut away along the contour of a model.

DESCRIPTION OF THE RELATED ART

In machining a workpiece, the workpiece generally is rough-machined into a desired shape and thereafter is subjected to finishing machining. In particular, when a metal mold is machined from a solid material (workpiece), the process of rough machining is often given much weight. Though automation, particularly the implementation of numerical control (NC), is making progress with regard to the machining of metal molds, an improvement in the efficiency of rough machining processes is especially required.

Heretofore, during the rough machining of pockets or the like, milling in 2 ½ dimensions has been carried out in such a manner that, as shown in FIG. 10(A), a 7 cutter 2 is moved in an X-Y plane at a height $Z_1$ so as to cut away a designated area AR1 of a workpiece 1. The cutter 2 is then lowered to a height $Z_2$ so as to cut away areas AR2 and AR3 of the workpiece 1 at this height, as shown in FIG. 10(B).

With rough machining based on such conventional milling, however, a problem encountered is that a long period of time is required, thereby diminishing machining efficiency. Particularly in the machining of metal molds, apart from the long period of time expended on rough machining, smoothing of the machined surface to the greatest extent possible is demanded in order to raise the efficiency of finish machining which follows the rough machining.

SUMMARY OF THE INVENTION

The present invention has been devised in order to solve these problems. Its object is to provide a contour profiling machine which shortens the period of time for rough machining and which forming a smooth machined surface.

According to the present invention, there is provided a contour profiling machine having a tracer head which is movable in three axes along a model shape. The operation of a cutting tool is controlled to be in synchronization with displacement of the tracer head. Limit setting means is employed for setting a limit as to one of the axes of the tracer head, and for setting limits parallel to and limits orthogonal to a direction of movement within a plane of movement determined by the first-mentioned limit. Polarity discrimination means is employed for discriminating polarities of the limits which are set relative to the direction of movement of the tracer head. Clamping means is employed for clamping contour profiling within a range defined by the set limits.

Thus, with the contour profiling machine of the present invention, the operation of the cutting tool is controlled to be in synchronization with the tracer head movable in three axes along the model shape. In cases where the model shape is either concave and convex. Rough machining can be performed with contour profiling clamped in a range defined by the set limits, while machining based on contour profiling equivalent to that of finish machining can be performed with the clamp released. Therefore, a smooth machined surface can be formed efficiently and at the same time as rough machining by utilizing the contour profiling function.

DESCRIPTION OF THE PREFERRED EMBODIMENT

An embodiment of the present invention will now be described in detail with reference to the drawings.

Figure 9:
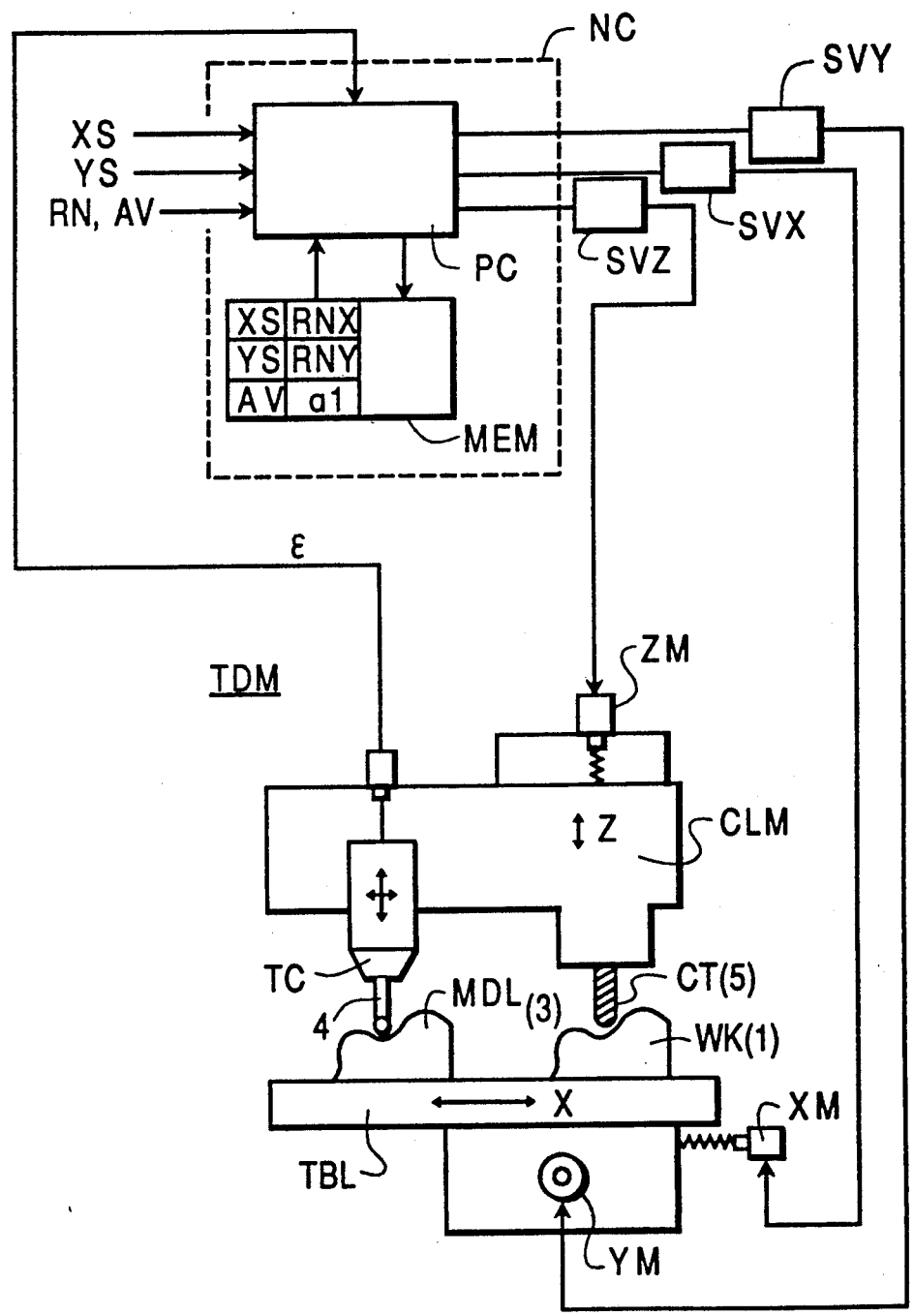
FIG. 9 is structural diagram showing an example of the contour profiling machine of the present invention.
Figure 10A:
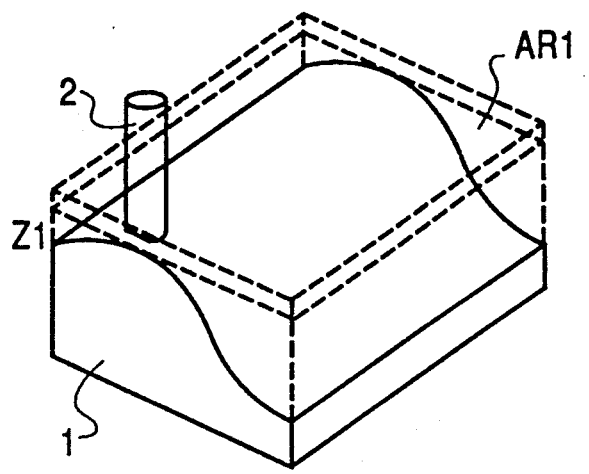
FIGS. 10(A) and 10(B) are diagrams of rough machining in the prior art.
Figure 10B:
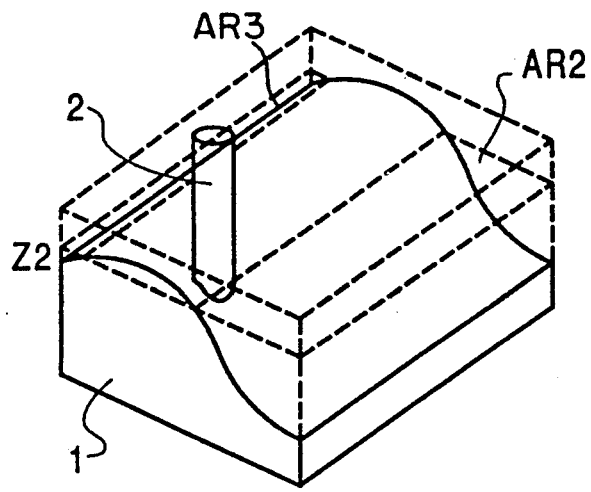

FIG. 9 is a diagram of one embodiment according to the present invention. A contour profiling machine TDM has a tracer head TC and a cutter CT. The tracer head TC has a stylus 4 at its distal end. The stylus 4 is held so as to be finely movable along a Z axis, an X axis and a Y axis. The fine movement of the stylus 4 is detected and output as a displacement magnitude $\epsilon$ by a differential detector. The cutter CT is, for example, a cutting tool 5. MDL denotes a model and WK a workpiece 1. CLM indicates a column on which the tracer head TC and the cutter CT are installed, and ZM indicates a Z-axis motor which drives and feeds the column CLM along the Z axis. Shown at TBL is a table on which the model MDL and the workpiece WK are placed, and which is movable in the X and Y directions. XM and YM indicate X-axis and Y-axis motors which drive and feed the table TBL along the X axis and Y axis, respectively. The contour profiling machine TDM is constructed of these components. SVX, SVY and SVZ represent X, Y and Z-axis servo circuits, respectively, and NC represents a tracing numerical controller. PC denotes the processor for the tracing numerical controller NC for executing ordinary tracing calculations, and MEM denotes the memory for the tracing numerical controller NC for storing programs, data, etc.

Next, tracing operations in the contour profiling machine TDM will be described. In the present invention, the machine is controlled so as to perform a converging-type operation in a convex model shape and to perform a diverging-type operation on a concave model shape.

Figure 1A:
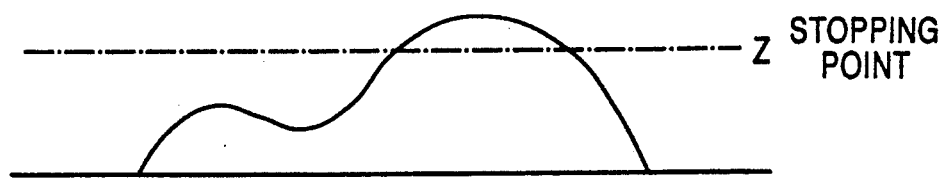
FIGS. 1(A) through 8 are diagrams explaining tracing operations according to the present invention.
Figure 1B:
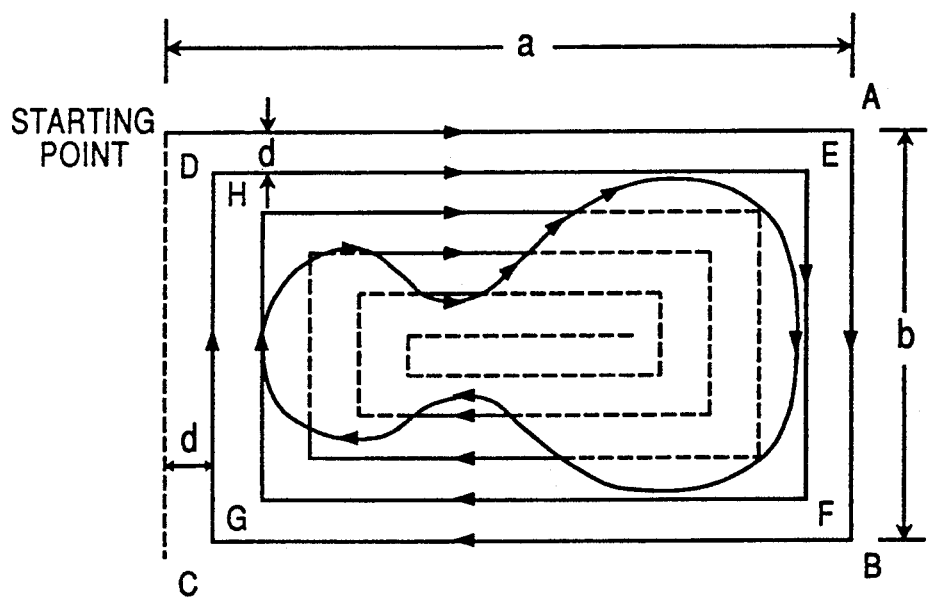

FIG. 1(A) shows the side shape of the model, and stop points for the Z axis are first set here. This serves to set a plurality of X-Y planes through the repeating function of the contour profiling machine TDM. A starting point shall be determined on an X-Y plane which is limited by stop points as shown in FIG. 1(B) by way of example.

If the start point determined does not lie on or in the model MDL, the Z axis is clamped and the tracer head is moved a traveling distance a based on an "initial movement quantity A" designated according to the setting of a "tracing direction". Any $\pm X$ and $\pm Y$ from the starting point can be selected as the "tracing direction", and the "initial movement quantity A" is set as an incremental quantity having no sign.

The tracer head has the polarity of a limit set in the direction of movement thus stipulated by the "tracing direction", and is moved to point A in a state where contour profiling is clamped within a range defined by the set limit. Here the tracer head does not come into contact with the model before reaching the point A.

Figure 2A:
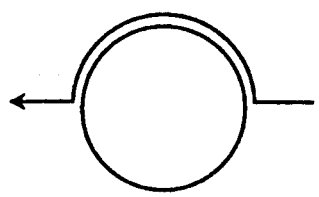
Figure 2B:
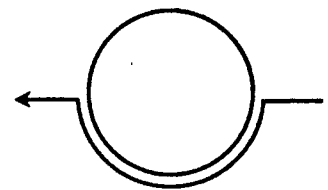

At the point A, instead of the limit used thus far, a new limit orthogonal thereto is set. With regard to the direction of rotation at point A, the counter-clockwise direction is designated by the sign "+" and the clockwise direction by the sign "−", as illustrated in FIG. 2. Here, the "direction of rotation" is designated as "−", and a distance b is designated as a second "initial movement quantity B".

At the point B, a new limit is set clockwise just as at the point A, and a value having a "depth of cut d" added to the distance a is designated as a movement quantity. As a result, in setting a new limit at a point C, the tracer head draws somewhat close to the model. In this manner, the tracer head is successively moved to points D, E, F ... with contour profiling clamped, and the head comes into contact with the surface of the model in a direction of movement stipulated by a limit at a point H.

When the tracer head thus contacts the model while moving with contour profiling clamped, the clamped state is released and contour profiling along the shape of the model is carried out. If the tracer head is still in contact with the model even in a case where the traveling distance along the X axis has exceeded a predetermined distance stipulated by the point H as shown in the drawing, then the unclamped state is maintained and contour profiling along the model shape is performed continuously. The above operations are repeated until the following condition holds.

The tracer head makes one revolution around the model due to resetting the limits four times, and movement of the tracer head is ended when the stylus of the tracer head has been constantly in contact with either the model or an end limit to be described later, during the revolution. Alternately, the tracer head makes one revolution around the model, when the value of either traveling distance a or b updated by the "depth of cut" d has become negative.

Figure 3:
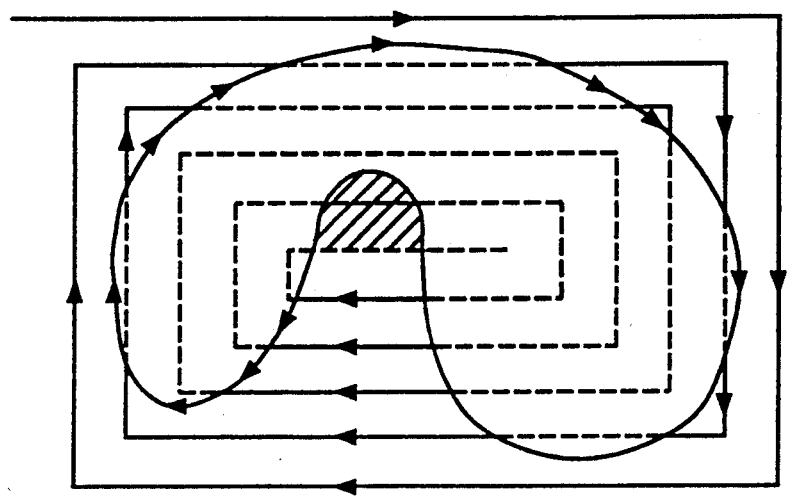

FIG. 3 is a diagram of the movement planes determined when specified Z-axis stop points have been set in a model having the same side shape as in FIG. 1(A). In this case, when contour profiling which merely converges toward the center of the model as in FIG. 1(B) is performed, the central hatched part of the model shape which is hollow is left uncut.

Figure 4:
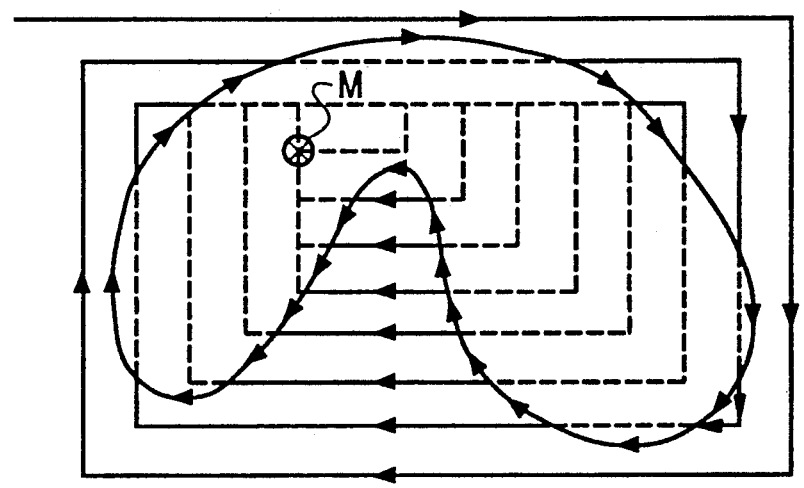

In FIG. 4, in order to prevent such an uncut part, a "target point" M is set and limits are set so that the end point of the movement of the tracer head will approach the "target point." In setting the point, a required condition is that half-lines along the X and Y axes with the target point m as the origin do not intersect the contour of the model two or more times.

Figure 5:
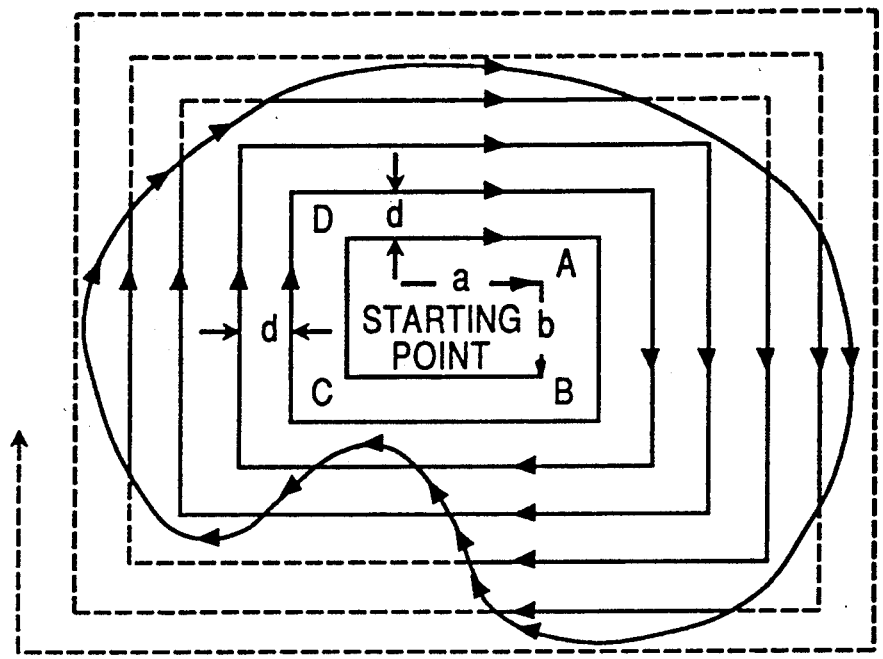

FIG. 5 is a diagram of the diverging-type clamped tracing performed on a concave model.

Figure 6A:
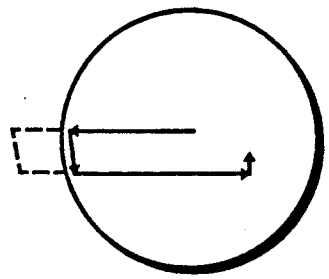
Figure 6B:
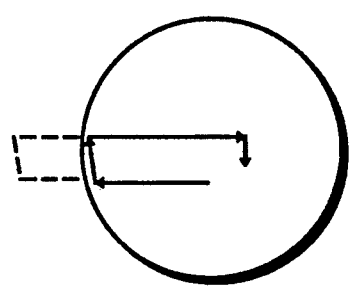

With regard to the direction of rotation from a starting point, the counter-clockwise direction is designated by + and the clockwise direction by −, as illustrated in FIG. 6. The diverging-type clamped tracing differs from the above-stated converging-type clamped tracing the sign of the depth of cut d and an end condition. As to the setting of the starting point, a required condition is that half-lines along the X and Y axes with the point a as the origin do not intersect the contour of the model two or more times, just as set forth above with respect to the end point of the diverging-type clamped tracing.

Figure 7A:
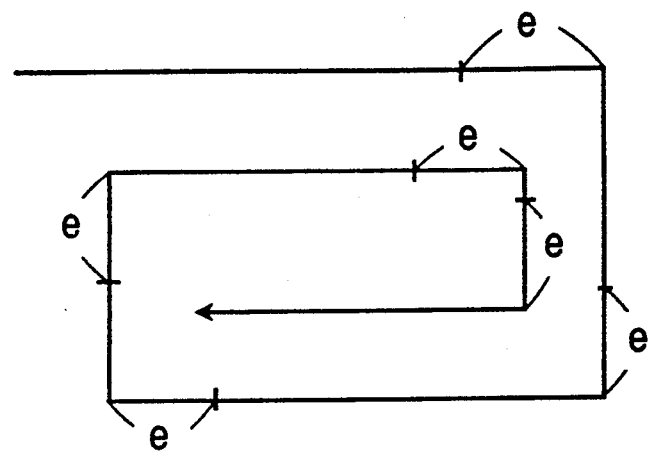
Figure 7B:
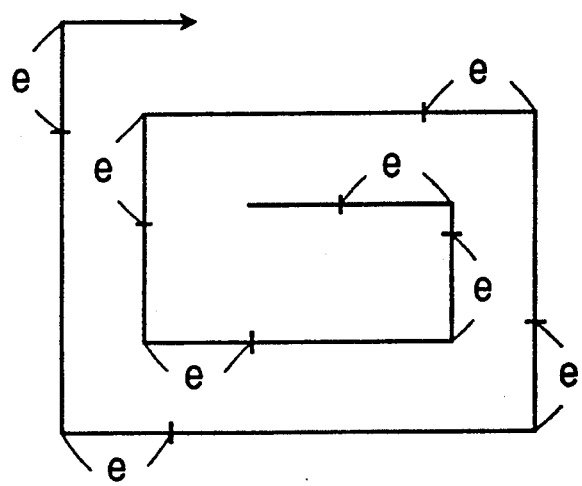

Regarding the traveling speed of the cutting tool, a deceleration area is set at a part e in each path, as illustrated in FIGS. 7(A) and (B). That is, when a remaining amount on one path has become less than a value set in a specified system parameter the traveling speed is changed to a speed set in another system parameter. However, when a command speed is equal to or lower than the speed stipulated by the system parameter, the speed does not change.

Figure 8:
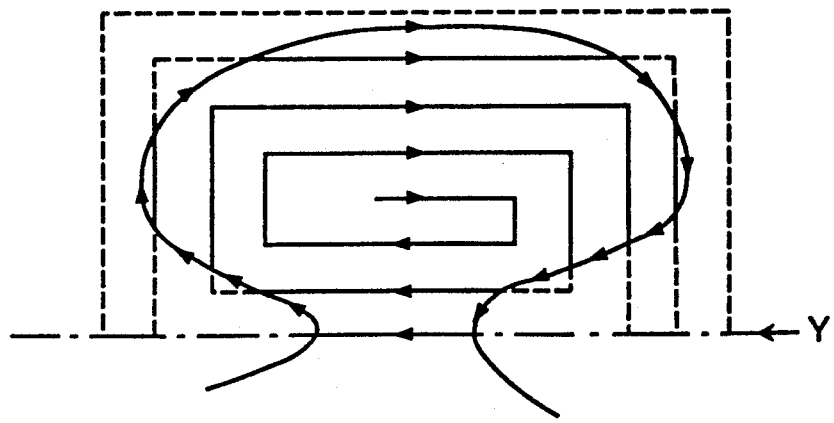

FIG. 8 is a diagram of the setting end limits in the case of the diverging-type clamped tracing. In the case of diverging type clamped tracing, areas to be machined can be designated by setting the limits of ±X and ±Y. In the illustrated example, machining with movement along the Y axis in the negative direction beyond −Y is forbidden.

Though an embodiment of the present invention has been described, the invention is not limited thereto but can be modified in a variety of ways without departing from the scope of the claims.

The contour profiling machine of the present invention can perform rough machining with contour profiling clamped, within a range defined by set limits, in cases where the shape of a model is concave and convex, and the machine is capable of efficiently forming a smooth machined surface by utilizing the contour profiling function.

We claim:

1. A contour profiling machine having a tracer head which is movable in three axes along a model shape, an amount of operation of a cutting tool is controlled in synchronization with displacement of the tracer head, said contour profiling machine comprising:

limit setting means for setting a limit as to one of the axes of the tracer head, and for setting limits parallel to and limits orthogonal to a direction of movement within a plane of movement determined with respect to the set limit of one of the axes of the tracer head;

polarity discrimination means, connected to said limit setting means, for discriminating polarities of the limits which are set relative to the direction of movement of the tracer head;

clamping means, connected to said limit setting means, for clamping contour profiling within a range defined by said set limits; and clamp releasing means for releasing a clamped state when the tracer head has contacted a model while moving with contour profiling clamped.

2. A contour profiling machine according to claim 1, further comprising detection means for detecting whether or not the tracer head is contacting the model when it has moved a predetermined distance, an unclamped state being maintained by said clamp releasing means if the tracer head and the model are in contact.

3. A contour profiling machine according to claim 1, further comprising limit forming means for forming, after the tracer head has moved a predetermined distance, a new limit which is orthogonal to the preceding limit within the movement plane.

4. A contour profiling machine according to claim 3, further comprising memory means for storing traveling distances so that the new limit to be set within the movement plane will change in predetermined constant value increments, wherein when the model shape is concave, the limit is enlarged to clamp contour profiling for the model shape to a diverging type, and wherein when the model shape is convex, the limit is reduced to clamp contour profiling for the model shape to a converging type.

5. A contour profiling machine according to claim 3, further comprising discrimination means for discriminating whether or not the new limit formed by said limit forming means lies inside the model, an unclamped state being maintained irrespective of the limit set by said limit setting means when the new limit has been discriminated to lie inside the model.

* * * * *

UNITED STATES PATENT AND TRADEMARK OFFICE
CERTIFICATE OF CORRECTION

PATENT NO. : 5,015,130
DATED : MAY 14, 1991
INVENTOR(S) : HITOSHI MATSUURA ET AL.

It is certified that error appears in the above-identified patent and that said Letters Patent is hereby corrected as shown below:

Col. 1, line 3, "FIELD OF THE INVENTION" should be

--BACKGOUND OF THE INVENTION
1) Field of the Invention--;

line 10, "DESCRIPTION OF THE RELATED ART" should be --2) Description of the Related Art--;

line 24, "7" should be deleted;
line 43, "which" should be deleted

Col. 2, line 6, "(A)" should be deleted;
line 47, "in" should be --on--;
line 59, "a" (second occurrence) should be --$\underline{a}$--.

Col. 3, line 9, "b" should be --$\underline{b}$--;
line 13, "a" should be --$\underline{a}$--;
line 38, " where" should be --When--.
line 39, "a or b" should be --$\underline{a}$ or $\underline{b}$--;

UNITED STATES PATENT AND TRADEMARK OFFICE
CERTIFICATE OF CORRECTION

PATENT NO. : 5,015,130

DATED : MAY 14, 1991

INVENTOR(S) : HITOSHI MATSUURA ET AL.

It is certified that error appears in the above-identified patent and that said Letters Patent is hereby corrected as shown below:

Col. 3, line 40, "d" should be --$\underline{d}$--;
      line 53, "m" should be --$\underline{M}$--;
      line 63, "the" (first occurrence) should be
            --in the--; and
      line 63, "d" should be --$\underline{d}$--.

Col. 4, line 2, "e" should be --$\underline{e}$--.

Signed and Sealed this

Eleventh Day of May, 1993

Attest:

MICHAEL K. KIRK

Attesting Officer     Acting Commissioner of Patents and Trademarks